(12) United States Patent
Lewandowski et al.

(10) Patent No.: US 6,460,205 B1
(45) Date of Patent: Oct. 8, 2002

(54) CASTER BRAKE MECHANISM

(75) Inventors: Jeffrey L. Lewandowski, Delton; Martin W. Stryker, Kalamazoo; Richard L. McDaniel, Constantine, all of MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

(21) Appl. No.: 09/592,038

(22) Filed: Jun. 12, 2000

(51) Int. Cl.[7] ................................................. A61G 1/02
(52) U.S. Cl. ............................................... 5/600; 5/625
(58) Field of Search ........................... 5/600, 86.1, 625, 5/626; 188/1.12, 29; 16/352, 20, 34; 280/763.1, 764.1; 296/20

(56) References Cited

U.S. PATENT DOCUMENTS

| | | | |
|---|---|---|---|
| 1,633,638 A | 6/1927 | Jarvis et al. | |
| 2,110,227 A | 3/1938 | Koenigkramer et al. | |
| 3,304,116 A | 2/1967 | Stryker | |
| 4,276,962 A | 7/1981 | Aulik | |
| 4,922,574 A | * 5/1990 | Heiligenthal et al. | .......... 16/35 |
| 5,987,671 A | * 11/1999 | Heimbrock et al. | ........... 5/600 |
| 6,264,006 B1 | * 7/2001 | Hanson et al. | ............. 188/1.12 |

* cited by examiner

*Primary Examiner*—Heather Shackelford
*Assistant Examiner*—Fredrick Conley
(74) *Attorney, Agent, or Firm*—Flynn, Thiel, Boutell & Tanis, P.C.

(57) ABSTRACT

The wheel brake includes a crank arm mounted on the patient support. An elongate first link is pivotally connected at one end to a first pivot pin provided on the distal end of the aforesaid crank arm. An elongate second link is pivotally secured to the patient support for movement about a second axis of rotation and is pivotally secured on one side of the second axis of rotation to the first link by a second pivot pin. A wheel engaging brake member is swingably suspended from the bed frame and above an outer periphery of a wheel rotatably and swivelably supported on the bed frame and for movement into and out of engagement with the aforesaid outer periphery. An elastically yieldable resilient member and an elongate third link are interconnected between the wheel engaging brake and the second link.

12 Claims, 8 Drawing Sheets

CASTER BRAKE MECHANISM

FIELD OF THE INVENTION

This invention relates to a wheel brake mechanism for a bed and, more particularly, to a wheel supported patient supporting bed with a wheel brake mechanism thereon.

BACKGROUND OF THE INVENTION

Wheel brake mechanisms are notoriously old as are wheel supported patient supports having a wheel brake mechanism thereon. The purpose performed by the wheel brake mechanism has heretofore been to prevent the wheels from rotating when locked as well as preventing castered wheels from castering. Not much importance was given to the situations where the wheel might move slightly or caster slightly when in the locked position. However, as uses for wheel supported patient supports has grown over the years, one particular use has developed in the surgical theater which mandates that the wheel supported patient support become fixedly located on its wheels and being free of slight rotational movements of the wheels as well as slight casterings of the castered wheels. The known wheel brakes have not provided satisfactory wheel locks that are acceptable to surgeons because of the impermissible slight movement of the patient support (or surgical table) during a surgical procedure. Accordingly, there exists a need to provide a solution to the aforesaid problem.

It is an object of this invention to provide a bed having a plurality of castered wheels thereon and a braking mechanism for fixedly locking the wheels in a secure manner so as to prevent rotation of the wheels about their respective axes of rotation and castering about their respective caster axes.

It is a further object of the invention to provide a bed, as aforesaid, which can be utilized to move hospitalized or assisted living patients from their room to a surgical site or other health care unit or therefrom to a recovery room, which wheels are fixedly positionable by a wheel braking mechanism so as to permit a use of the bed in a surgical or other type of patient care environment.

It is a further object of the invention to provide a bed having a force multiplying mechanism actuatable by a conventional brake pedal wherein an attendant may apply the brakes to the wheels supporting the bed with minimal force to effect a secure positioning of the bed in a desired location.

It is a further object of the invention to provide a bed, as aforesaid, having four castered wheels thereon and wherein the wheel braking mechanism simultaneously controls the locking and unlocking of the aforesaid four castered and rotatable wheels.

It is a further object of the invention to provide a bed, as aforesaid, wherein the wheel brake activating mechanism can also be used to deploy an auxiliary fifth wheel which, when in the deployed position, facilitates steering the wheel supported bed during movements thereof in a direction parallel to the longitudinal axis thereof.

It is a further object of the invention to provide a brake mechanism for a wheel supported bed which is easy to maintain and easy to operate.

SUMMARY OF THE INVENTION

The objects and purposes of the invention are met by providing a bed with a wheel brake. The wheel brake includes a crank arm mounted on a frame of the bed and movable between first and second positions about a first axis of rotation. An elongate first link is pivotally connected at one end to a first pivot joint provided on the distal end of the aforesaid crank arm. An elongate second link is pivotally secured to the bed frame for movement about a second axis of rotation between third and fourth positions and is pivotally secured on one side of the second axis of rotation to the first link by a second pivot joint oriented a finite distance from the aforesaid first pivot joint. A wheel engaging brake member is swingably suspended from the bed frame and above an outer periphery of a wheel rotatably and swivelably supported on the bed frame and for movement into and out of engagement with the aforesaid outer periphery. An elastically yieldable resilient member and an elongate third link are interconnected between the wheel engaging brake and the second link for effecting a continuous urging of the third link toward the second link when the crank arm is in the second position and the first pivot joint is oriented on a side of a center position remote from a side caused by the crank arm being in the aforesaid first position so that the wheel engaging brake is swung into engagement with the outer periphery of the wheel in response to the crank arm moving from the first position to the second position and the resilient member yielding to permit the first pivot joint to move from one side to an opposite side of the center position, the resilient member effecting a holding of the wheel engaging brake in engagement with the aforesaid outer periphery of the wheel.

BRIEF DESCRIPTION OF THE DRAWINGS

Other objects and purposes of this invention will be apparent to persons acquainted with apparatus of this general type upon reading the following specification and inspecting the accompanying drawings, in which.

DETAILED DESCRIPTION

Figure 1:
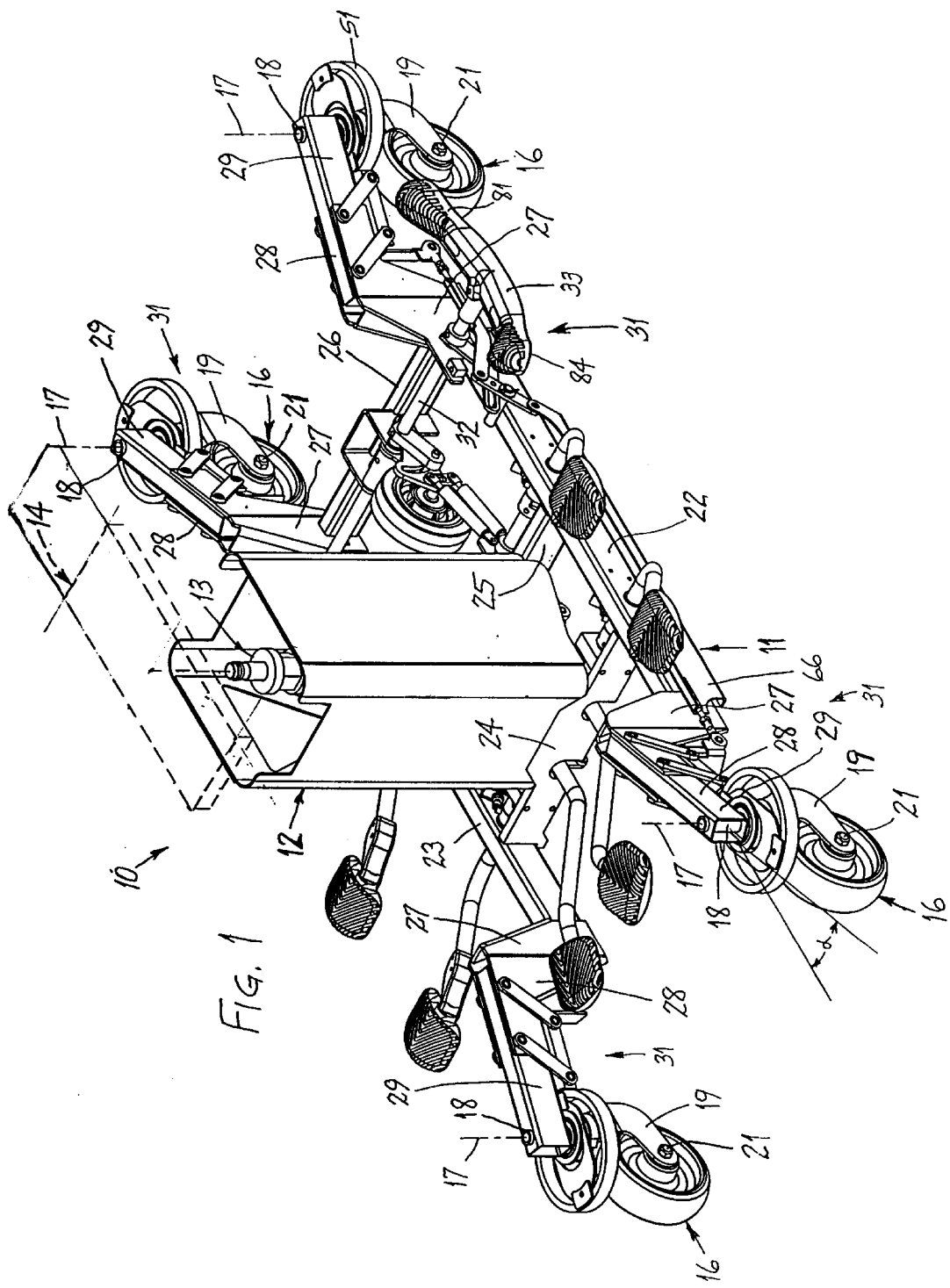
FIG. 1 is a perspective view of a patient support and, more particularly, the wheel supported base thereof.

A bed, here a patient supporting bed, 10 is illustrated in FIG. 1 and includes a wheel supported base 11 on which is supported a lift column or pedestal 12 which enshrouds a jack member 13 facilitating elevational movement of a patient supporting surface 14 mounted thereon and schematically illustrated by broken lines. The wheel supported base 11 includes, in this particular embodiment, four caster-type wheels 16, one in each of the four corners of the patient supporting bed 10. Each caster-type wheel 16 is pivotal about a vertically upright axis 17 of a king pin 18 or the like. Each king pin 18 is secured to the bite portion of a wheel yoke 19 to the legs of which is secured an axle member 21 rotatably supporting the wheel 16 between the legs.

The base frame 11 includes a pair of elongate side rails 22 and 23 interconnected by cross braces 24, 25 and 26. It is at the longitudinal ends of each of the side rails 22 and 23 that the aforesaid caster-type wheels 16 are located. In this particular embodiment, opposite longitudinal ends of each of the side rails 23 has secured thereto an upstanding stanchion 27 to which is secured a bracket 28 having a generally horizontally extending leg component 29 cantilevered longitudinally from each stanchion 27 and at an angle a with respect to each of the side rails 22, 23. In other words, the legs 29 in each of the four corners of the patient supporting bed 10 diverge longitudinally laterally outwardly. The outboard end of each of the legs 29 has a vertically aligned hole therein adapted to receive the king pin 18 of a respective caster-type wheel 16 therein.

A wheel brake mechanism 31 embodying the invention will now be described in detail. The wheel brake mechanism includes an elongate rod 32 rotatably supported on the side rails 22 and 23 and extends therebetween and has on opposite outboard ends thereof a pedal 33, only one pedal being illustrated in FIG. 1. Since the brake mechanisms 31 are the same on the four corners of the bed for simultaneously activating the brake devices for each of the wheels 16, only the brake mechanism on one side will be described in detail, namely, the forward-most side illustrated in FIG. 1.

Figure 4:
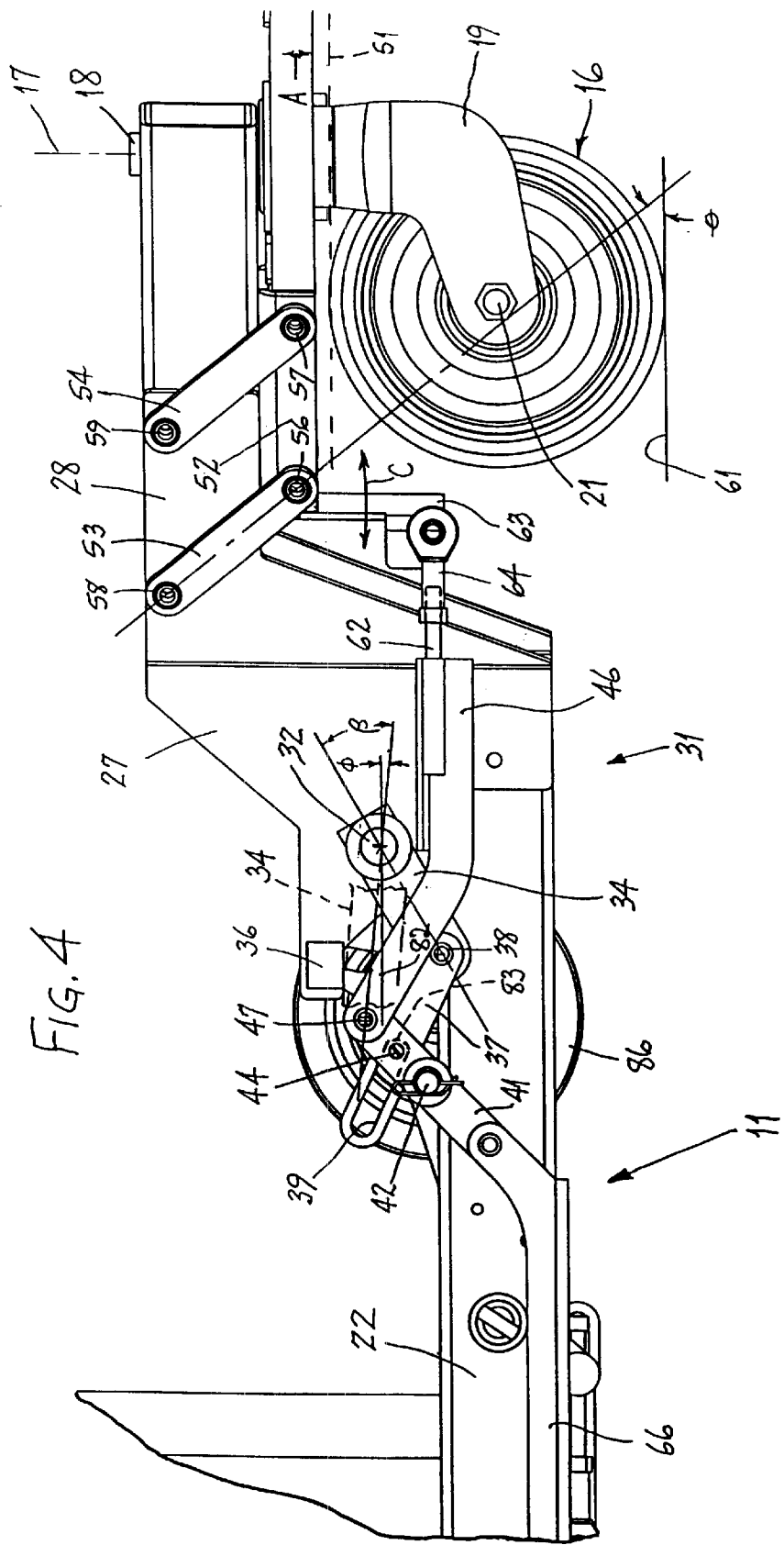
FIG. 4 is a side view of a fragment of the right side of the base frame illustrated in FIG. 1.
Figure 5:
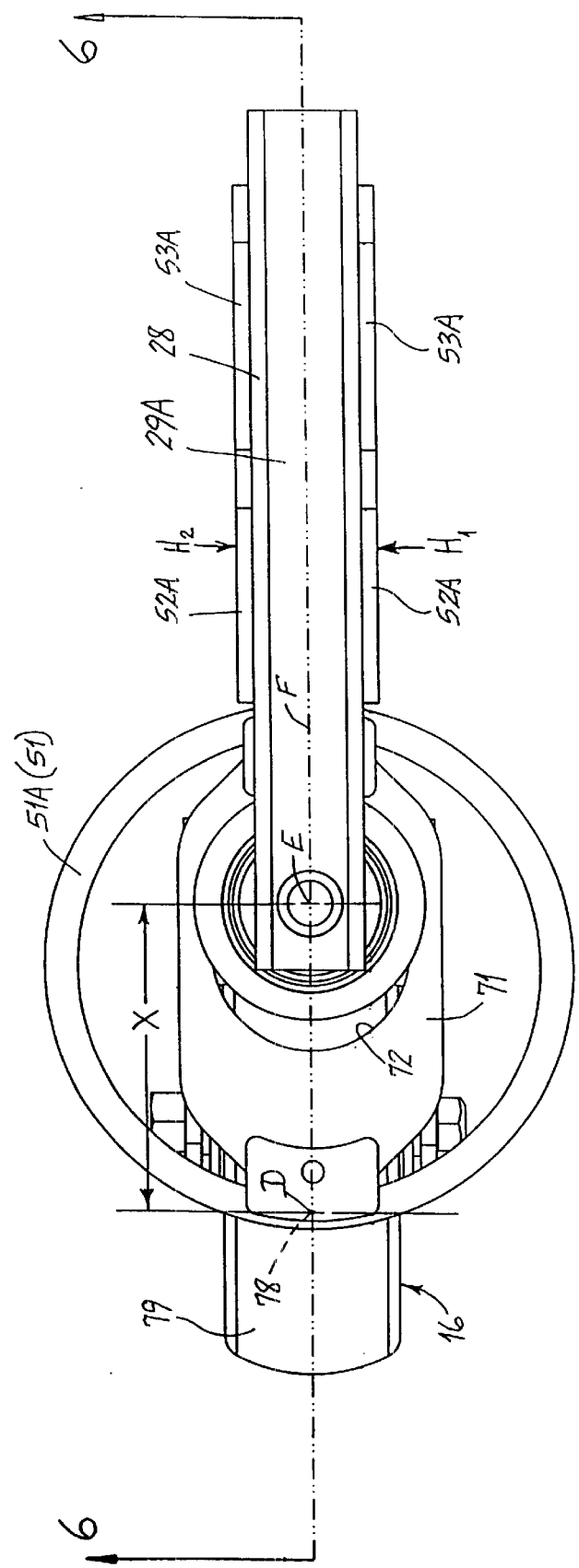
FIG. 5 is an enlarged top view of a wheel and brake mechanism therefor.
Figure 6:
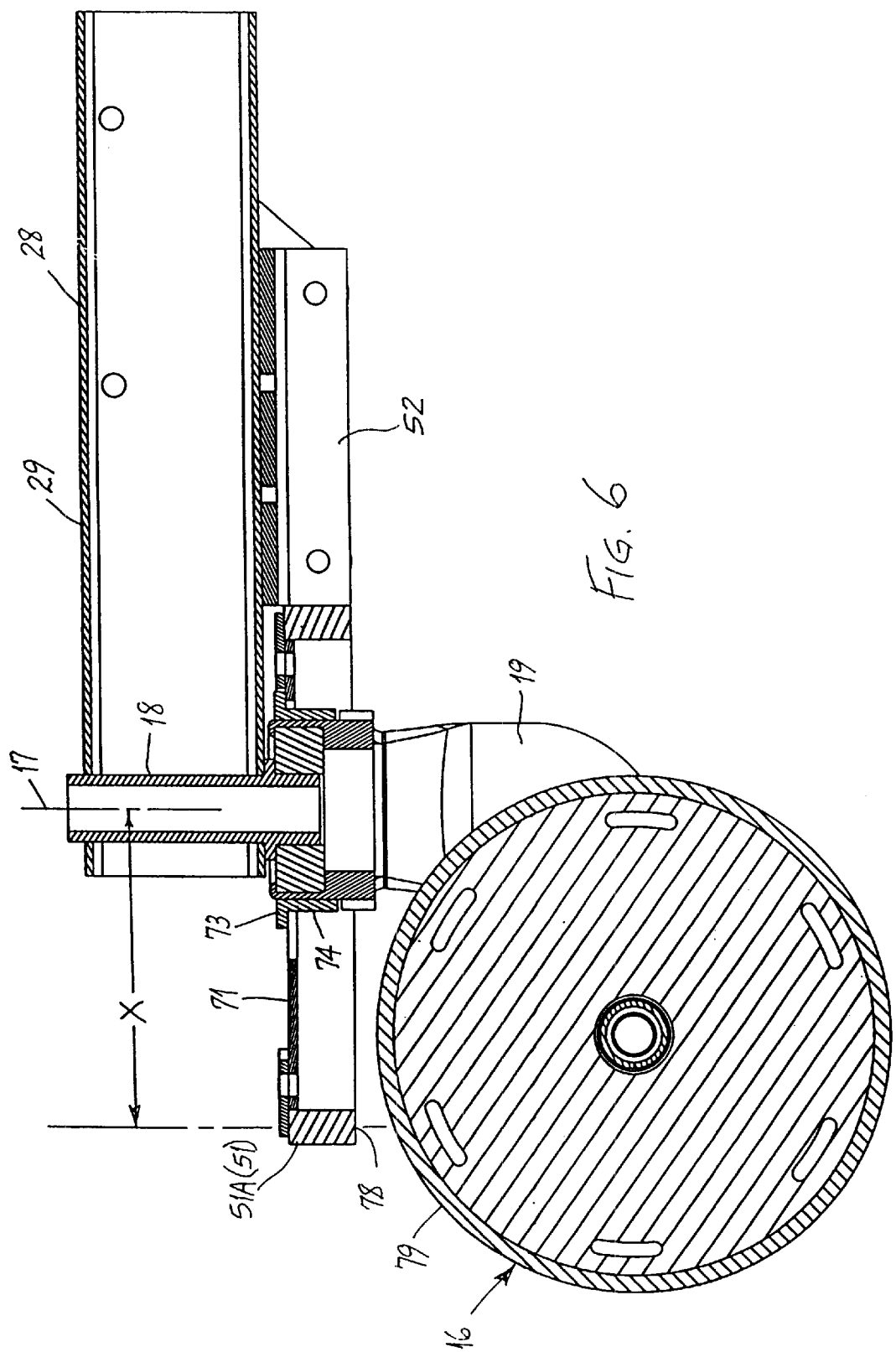
FIG. 6 is a sectional view taken along the line 6—6 of FIG. 5.
Figure 7:
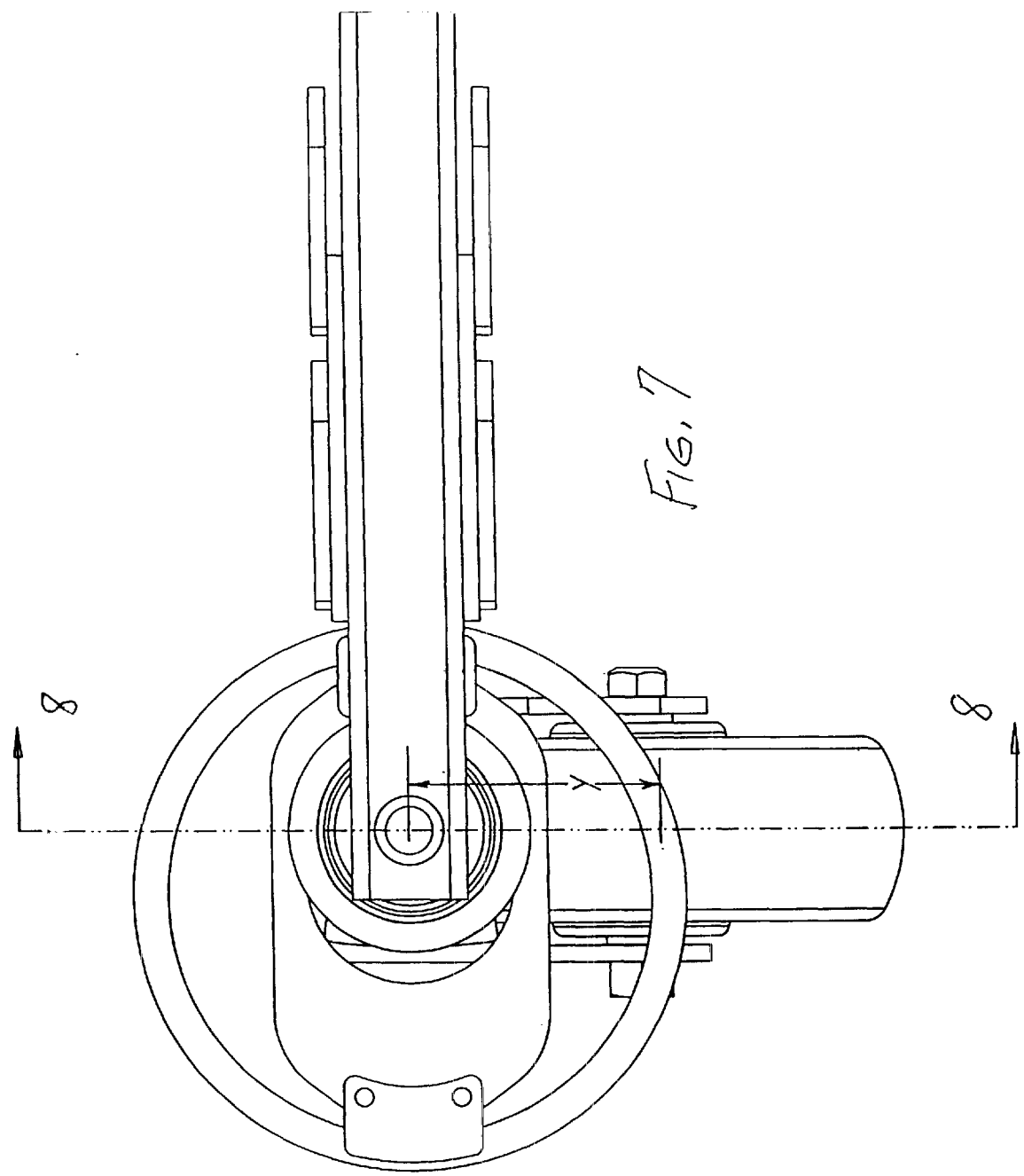
FIG. 7 is an enlarged top view like FIG. 5 but with the wheel castered 90°.

An arm 34 is secured to the rod 32 and is rotatable therewith between a first position illustrated in FIG. 4 and a second position illustrated in broken lines. The arm 34, when in the broken line position, engages a stop member 36 secured to the stanchion 27. The arm 34 traverses the angle β. A first link member 37 is pivotally secured at one end thereof to the distal end of the arm 34 by a first pivot joint, here a pin 38. The link includes an elongate slot 39 therein. A second link 41 is pivotally secured to the side rail 22 by an axle pin 42 received in a sleeve 43 secured, as by welding, to the side rail 22. A second pivot pin 44 is secured to the second link 41 and includes a segment slidably received in the slot 39. A third link 46 is secured at one end to an end of the second link 41 on a side of the second pivot pin 44 remote from the axle pin 42 and by a third pivot joint, here a pin 47.

A wheel engaging brake ring 51 is secured to a frame 52 that is suspended by two pairs of parallel links 53 and 54 each pivotally secured at one end as at 56 and 57 to the frame 52 and at the other end, as at 58 and 59 to the leg component 29 of the bracket 28. The parallel links 53 and 54 remain in parallel relation as they pivot about their respective pivot axes so as to keep the frame 52 and associated brake ring 51 generally horizontally aligned during all vertical movement in direction of the arrow A (FIG. 4) of the brake ring 51. In this particular embodiment, the links 53 and 54 are each oriented at an angle θ relative to the floor surface 61 and to the horizontally extending segment 62 of the third link 46. An elastically yieldable resilient member 63 is fixedly secured at one end to the frame 52 and is pivotally secured at the other end thereof to the distal end of the horizontal segment 62 of the third link 46. The elastically yieldable member 63 is similar in kind to a leaf spring and allows lost motion to occur between the third link 46 and the frame 52 in direction of the arrow C. A length adjustment mechanism 64 is provided to facilitate adjustment of the length of the link 46 relative to the frame 52.

Figure 2:
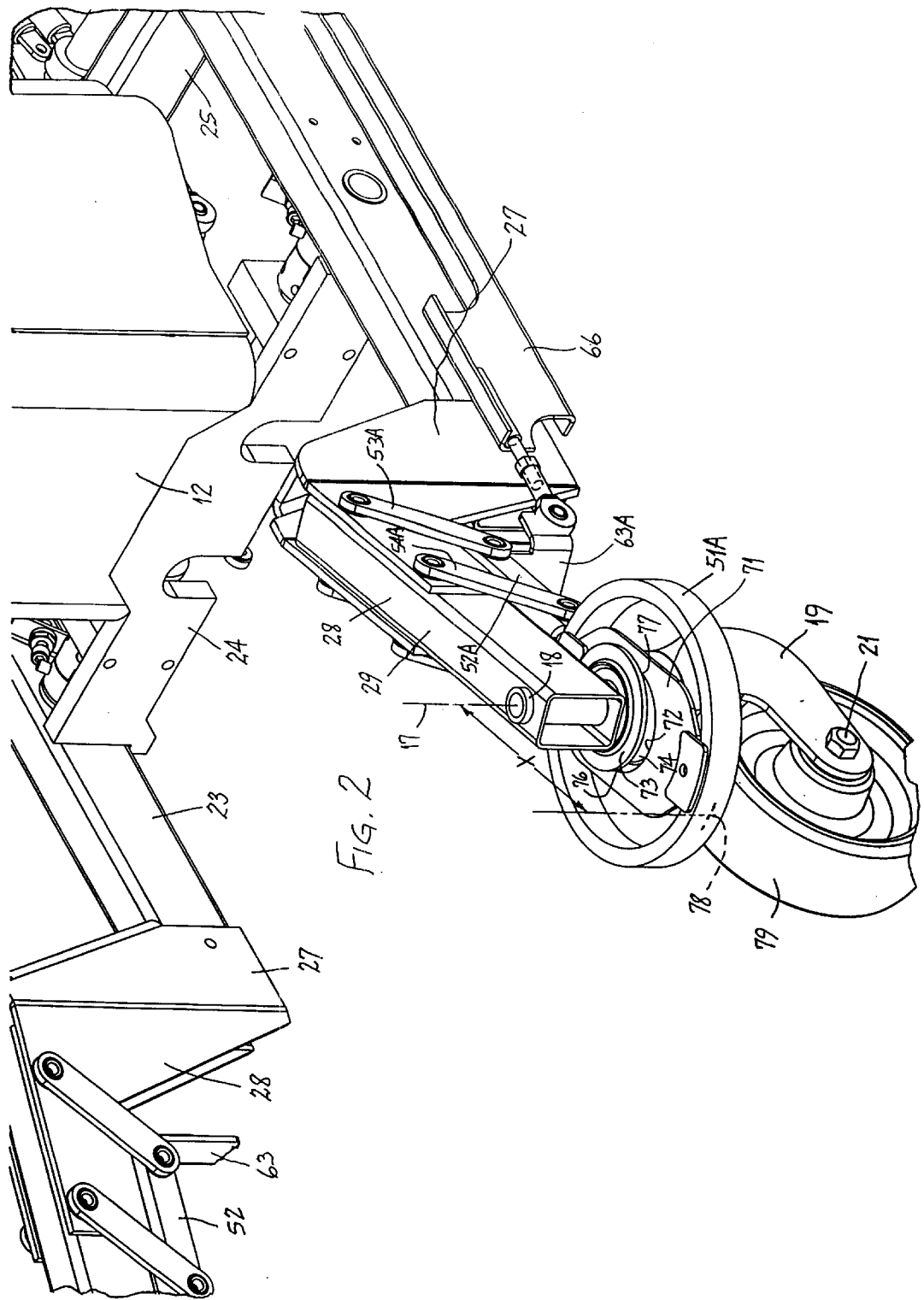
FIG. 2 is an enlarged fragment of FIG. 1.

A fourth link 66 is secured at one end by a fourth pivot joint, here a pin 67 to an end of the second link 41 at an end thereof remote from the end whereat is located the third pivot pin 47. The fourth link 66 extends generally horizontally to an elastically yieldable member 63A (FIG. 2) which is in turn fixedly connected to a frame 52A having fixedly supported thereon a brake ring 51A. Details of the support of the brake ring 51A, the frame 52A and the supporting links illustrated in FIG. 2, are essentially identical to the structure described above and, therefore, further detailed discussion thereof is believed unnecessary.

Figure 8:
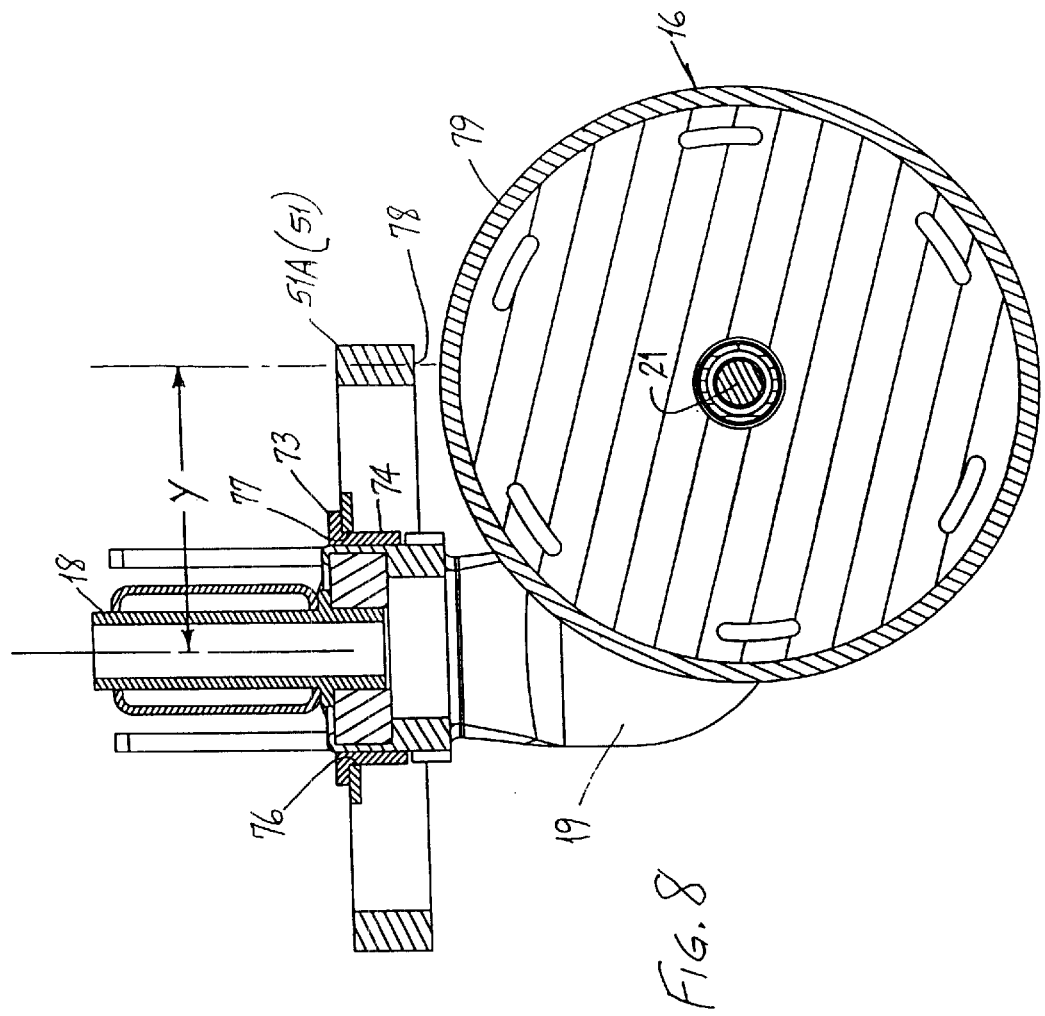
FIG. 8 is a sectional view taken along the line 8—8 of FIG. 7.

Each brake ring is identical and, therefore, only the brake ring 51A illustrated in FIGS. 2 and 5–8 will be described in detail. Each ring 51A (51) is circular in construction and includes a guide plate 71 secured at both ends thereof on a diameter of the ring 51A. The guide plate 71 includes an elongate slot 72 therein, the elongate direction of the slot 72 corresponding to the longitudinal axis of the leg 29. A sleeve 73 encircles the king pin 18 of the wheel 16 and has a radially outwardly facing cylindrical surface 74 having a diameter generally equal to or just slightly less than the lateral spacing between the side walls 76 and 77 (FIG. 8) of the elongate slot 72. The longitudinal ends of the slot 72 are radiused to conform to the radius of the outer surface 74 of the sleeve 73. The guide plate 71 is capable of moving vertically relative to the sleeve 73 so as to enable a lower edge surface 78 of the brake ring 51A to engage a radially outwardly facing peripheral surface 79 of the wheel 16. Since the region of the lower edge surface 78 of the ring 51A is spaced radially outwardly from the axis 17 of the king pin 18 by a distance X and Y (see FIGS. 6 and 8), the close tolerance fitting of the side edges 76 and 77 of the slot 72 relative to the outer surface 74 of the sleeve 73 will stabilize the base 11 when the wheel brake mechanism 31 places each brake ring 51 (51A) into engagement with the peripheral surfaces 79 of each of the wheels 16 as depicted in FIG. 8. That is, the moment arms defined by the dimension X (FIG. 5) will, without the guide plate 71, be long enough to enable one of the two points D and E to move above or below the line F in response to forces $H_1$ or $H_2$ being applied to the base 11 {legs 29A (29)}. However, the side walls 76 and 77 of the slot 72 in the guide plate 71 operatively engage the surface 74 of the sleeve 73 to substantially prevent movement of wheel 16 when the ring 51A is engaged therewith. The power of the force multiplying effect provided by the links 52A (52) and 53A (53) causing the ring 51A (51) to forcibly engage the peripheral surface 79 of the wheel 16 will substantially prevent movement of the wheel in any direction transverse to the direction of the movement arm Y depicted in FIG. 7.

When it is desired to activate the brakes for each of the wheels 16, the attendant need only place the foot onto the right side 81 of the foot pedal 33 (FIG. 1) and press downwardly. This motion will cause the arm 34 to move from the solid line position in FIG. 4 to the broken line position through the angle β and passed a critical center position 82 and through an angle segment θ until the arm 34 engages the stop 36. Such action will draw the respective third link 46 and fourth link 66 toward one another due to a driven counterclockwise motion of the second link 41 caused by a leftward movement of the first link 37 to cause the frame 52 (52A) to move toward the geometric center of the base 11 thereby causing each ring 51 (51A) to move from the solid position illustrated in FIG. 4 to the broken line position to cause the respective surface regions 78 on each of the rings 51 (51A) to engage the peripheral surface 79 of each of the wheels 16. When the surface region 78 on each of the rings engages the peripheral surface 79 on each of the wheels, the arm 34 will not have yet reached the stop 36. As a result, the elastically yieldable member 63 (63A) associated with each wheel will need to yield to the leftward motion of the third link 46 and the rightward motion of the fourth link 66 to facilitate the final traverse of the arm 34 through the aforementioned angle θ to the broken line position illustrated in FIG. 4. The elastically yieldable member 63 will now apply a continued force attempting to urge the third link 46 and the fourth link 66 toward each respective wheel, which motion will be limited by engagement of the second pivot pin 44 with an end 83 of the slot 39 in the first link 37. In other words, the arm 34 will be held in an over dead center position, namely, that position illustrated in broken lines in FIG. 4 by the urging of the elastically yieldable member 63. As a result, the foot pedal 33 will remain in the locked position until a corresponding force is applied to the left side 84.

A rotation of the rod 32 in a counterclockwise direction by reason of an application of force to the left side 84 of the foot pedal 33 will unlock the wheels 16 and effect a deployment of an auxiliary fifth wheel 86 causing same to be moved into engagement with the floor surface 61. More specifically, an arm 87 is fixedly secured to the rod 32 and is movable therewith. A pin 88 is secured to the arm 87 adjacent the distal end thereof and is received in the slot 89 of a wheel yoke 91 supporting the wheel 86 for rotation about its axle of rotation 92. The length of the slot 89 is sufficient to enable the pin 88 to move therein when the rod 32 is rotated clockwise to activate the brakes during the period of time that the auxiliary wheel 86 is in the elevated position illustrated in FIG. 3. However, when it is desired to deploy the auxiliary wheel 86, the pin 88 will engage one end of the slot 89 causing the yoke 91 to be driven in a counterclockwise direction facilitating a lowering of the auxiliary wheel 86 toward the floor surface 61. During this movement, the pin 44 slides in the slot 39. A plurality of gas spring 93 are utilized to drive the wheel yoke 91 counterclockwise when the axle of rotation 92 for the wheel 86 drops below a horizontal plane containing the axis of rotation of the rod 32. Thus, the peripheral surface of the auxiliary wheel 86 will be urged into engagement with the floor surface 61 by action of the gas springs 93.

Figure 3:
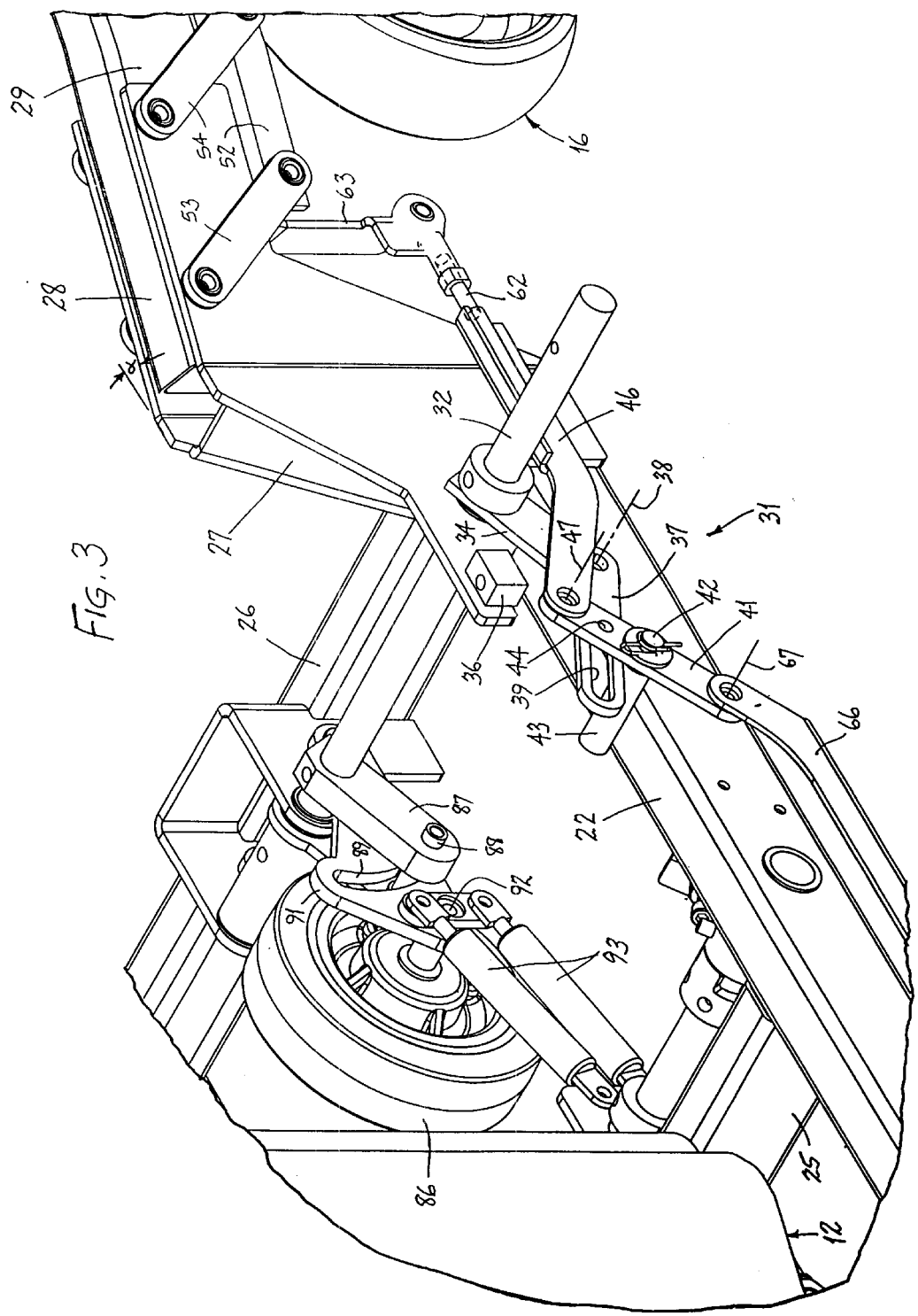
FIG. 3 is an enlarged fragment of FIG. 1.

Since the end 94 of the slot 89 will have moved counterclockwise with the yoke 91 to a point where it comes into engagement with the pin 88, it will be obvious to the skilled artisan that a vertically downward force applied to the right side of the foot pedal 81 will cause the wheel yoke 91 to be driven clockwise back toward the position illustrated in FIG. 3 whereat the gas springs 93 will cause the wheel to be driven to its final destination once the axle of rotation 92 moves above the aforesaid horizontal plane containing the axis of rotation for the rod 32.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A bed frame with a wheel brake, wherein the improvement comprises:
    a rotatable member mounted on said bed frame and movable between first and second positions about a first axis of rotation;
    an arm on said rotatable member having at a distal end thereof a first pivot joint movable with said rotatable member to positions oriented on opposite sides of a center position of said movement;
    an elongate first link pivotally connected at one end to said first pivot joint;
    an elongate second link pivotally secured to said bed frame for movement about a second axis of rotation between third and fourth positions and pivotally secured on one side of said second axis of rotation to said first link by a second pivot joint oriented a finite distance from said first pivot joint;
    a wheel engaging brake swingably suspended from said bed frame and above an outer periphery of a wheel rotatably and swivelably supported on said bed frame for movement into and out of engagement with said outer periphery;
    an elongate third link pivotally secured at one end thereof to said second link;
    elastically yieldable resilient means connected intermediate a second end of said third link and said wheel engaging brake and effecting a continuous urging of said third link toward said second link when said rotatable member is in said second position and said first pivot joint is oriented on a side of said center position remote from a side caused by said rotatable member being in said first position;
    whereby said wheel engaging brake is swung into engagement with said outer periphery of said wheel in response to said rotatable member moving from said first position to said second position and said resilient means yielding to permit said first pivot joint to move from one side to an opposite of said center position, said resilient means effecting a holding of said wheel engaging brake in engagement with said outer periphery of said wheel.

2. The bed frame according to claim 1, wherein four wheels and a wheel engaging brake for each wheel are provided.

3. The bed frame according to claim 1, wherein said first and second axes of rotation are parallel.

4. The bed frame according to claim 1, wherein said wheel engaging brake includes a brake frame to which is secured said elastically yieldable resilient means and a wheel engaging ring, said brake frame being swingably suspended from said bed frame by at least one elongate link, one end of which is pivotally connected to said brake frame at a location intermediate locations whereat said elastically yieldable resilient means and said wheel engaging ring are secured on said frame.

5. The bed frame according to claim 4, wherein said brake frame is swingably suspended from said bed frame by at least two parallel elongate links, one end of each thereof being pivotally connected to said brake frame at locations intermediate locations whereat said elastically yieldable resilient means and said wheel engaging ring are secured on said brake frame.

6. The bed frame according to claim 4, wherein a longitudinal axis of said elongate link is oriented at an acute angle to a horizontal surface on which rests said wheel.

7. The bed frame according to claim 4, wherein said wheel is secured through a stem to said bed frame, said stem having an encircling guide sleeve therearound of a finite outer diameter; and
    wherein said wheel engaging ring has a centrally located elongate opening having a width generally equal to or slightly greater than said outer diameter of said guide sleeve so as to facilitate reciprocal movement of said wheel engaging ring in a first direction parallel to an elongate direction of said elongate opening relative to said stem while simultaneously preventing movement laterally thereof.

8. The bed frame according to claim 7, wherein a swingable suspension of said wheel engaging brake effects an inability of said wheel engaging brake to be subject to movement about an axis of said stem.

9. The bed frame according to claim 1, wherein said elastically yieldable resilient means is a leaf spring anchored at one end to said wheel engaging brake and extending away therefrom to a distal end whereat said third link is pivotally secured.

10. The bed frame according to claim 1, wherein four wheels are provided, two wheels at a head end of said base frame and two wheels at a foot end of said base frame, and wherein a wheel engaging brake is provided for each wheel, each said wheel engaging brake including an elongate third link and an elastically yieldable resilient means connected to a brake frame on which is provided a wheel engaging ring, said third link connected to said elastically yieldable resilient means associated with a wheel engaging brake at an end of said bed frame remote from said first mentioned wheel engaging brake being pivotally secured by a third pivot pin to said second link on a side of said second axis of rotation remote from said second pivot pin.

11. The bed frame according to claim 1, wherein said third link includes an adjustable length member connected to and oriented between said third link and said elastically yieldable resilient means.

12. The bed frame according to claim 1, wherein said rotatable member is movable to an additional third position, said first position being intermediate said second and third positions;

wherein said second link includes an elongate slot therein for facilitating movement of said second pivot pin along a length of said second link away from said first pivot pin in response to said rotatable member moving from said first position to said third position; and wherein a fifth wheel movable only about an axis of rotation thereof is supported on said bed frame and is movable from a retracted to a deployed position solely in response to a movement of said rotatable member between said first position to said third position.

* * * * *